Patented June 22, 1948

2,444,002

UNITED STATES PATENT OFFICE 2,444,002

PREPARATION OF HETEROCYCLIC COMPOUNDS

James H. Boothe, Pearl River, N. Y., assignor to American Cyanamid Company, New York, N. Y., a corporation of Maine No Drawing. Application February 18, 1946, Serial No. 648,554

9 Claims. (Cl. 260—250)

This invention relates to a new method of preparing organic compounds having useful biological properties.

The compounds and the process by which they are prepared in accordance with the present invention may be illustrated by means of the following equation:

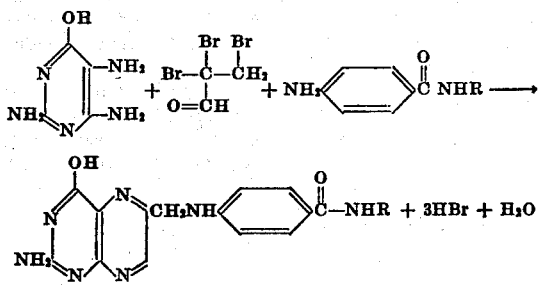

In these formulas the group —NHR represents the residue of an amino acid, as will appear in greater detail hereinafter.

The three intermediates shown in the above reaction are all known compounds whose preparation and properties are described in the chemical literature. The first intermediate, as illustrated, is commonly known as 2,4,5-triamino-6-hydroxy pyrimidine. This compound, however, is known to exist in one or more tautomeric forms, such as, for example, 2,4,5-triaminopyrimidone-6. This tautomer and the other tautomers which may exist may, as would be expected, be used in the same reaction under the same conditions to produce the same products. As will also appear obvious to those in the art the final product may exhibit the same kind of tautomerism.

The second intermediate shown is alpha, alpha, beta - tribromopropionaldehyde. Other alpha, alpha, beta-trihalopropionaldehydes, such as alpha, alpha, beta-trichloropropionaldehydes and alpha, alpha, beta-triodopropionaldehydes, may be used in the reaction as illustrated. The corresponding acetals may also be used without any essential modification of the reaction. Of course, as would be expected, the alcohol of the acetal is released during the reaction, probably as a preliminary step.

The third intermediate is an amide of para-aminobenzoic acid. The preferred amides are those of amino acids, the radical —NHR representing the residue of an amino acid. This group is usually non-functional insofar as the reaction of the invention is concerned but is important in determining the biological characteristics of the product. The preferred amino acid residue is that of glutamic acid although other amino acid residues such as those of glycine, aspartic acid, leucine, alanine, iso-valine, cysteine and the like may be used. The group —NHR may also represent the residue of an amino acid, having one or more peptid linkages. Such intermediates would include, for example, para-aminobenzoylglutamic acid, para-aminobenzoylglutamylglutamic acid, para-aminobenzoylglutamylglutamylglutamic acid, and the like and still others such as para - aminobenzoylglutamylglycylglutamic acid in which the amino acid residue is made up of more than one amino acid. As these amino acid amides possess free carboxyl groups it will be apparent that the salts and esters thereof may likewise be employed in the process.

The preferred products of the invention possess vitamin-like properties and appear to be necessary for, or stimulate the growth of, certain bacteria and higher forms of animal life. They are useful in stimulating haemoglobin formation and are useful in the treatment of agranulocytosis and other related diseases. They are, generally speaking, yellow to reddish brown crystalline solids, difficultly soluble in water and organic solvents.

The reaction may be carried out over a wide range of hydrogen ion concentrations, from about pH 2 to pH 9. The preferred conditions are acidic, at a pH of from about 3 to 5. The hydrogen ion concentration may be controlled when desired by the addition of a buffering agent, as in Example 1, or by the addition of an acid or alkali, as necessary, during the course of the reaction.

Inasmuch as the trihalopropionaldehydes are difficultly soluble in water it is preferred that they be dissolved in a solvent such as alcohol, benzene, acetic acid, or other solvent. The reaction will usually take place at room temperatures but heating up to about 50° C. may be desirable under some conditions.

As the 2,4,5-triamino-6-hydroxy pyrimidine is easily oxidized, a small amount of a reducing agent, such as sodium hydrosulfite, may be added. The acid or cationic salts of the 2,4,5-triamino-6-hydroxy pyrimidine may also be used as intermediates but, under the preferred conditions of hydrogen ion concentration, the compound most likely exists in the free state.

The invention will now be described in greater detail in the following examples. All parts are by weight unless otherwise indicated.

Example 1

Five parts of 2,4,5-triamino-6-hydroxy pyrimidine was dissolved in 500 parts of water containing a trace of sodium hydrosulfite and 11.6 parts of sodium acetate. A solution of 7.6 parts of alpha, alpha, beta-tri-bromopropionaldehyde (prepared according to Bull. Soc. Chim. (4) 37, 1390 (1925)) in about 400 parts of ethyl alcohol and a solution of 12 parts of para-aminobenzoylglutamic acid in 500 parts of water were prepared and the two solutions were added simultaneously to the solution of 2,4,5-triamino-6-hydroxy pyrimidine with stirring at room temperature. After one hour the precipitate which had formed was recovered by filtration. On examination it was found to contain N-[4-{-[(2-amino-4-hydroxy-6-pyrimido [4,5-b] pyrazyl) methyl]-amino}benzoyl]glutamic acid.

Although it is not necessary that the product be highly purified for many of its important uses, one method of obtaining a highly purified material in crystalline form may be illustrated by the following general procedure. Other methods of purification, dependent upon the physical and chemical properties of the substance, may be devised. The crude reaction mixture, prepared as described above, is first dissolved in 0.2 N sodium hydroxide solution at a concentration equivalent to 400 micrograms ($\gamma$)/ml. Barium chloride is then added to 0.2 N and the mixture is stirred for ten minutes and filtered. Ethanol is added to the filtrate to a concentration of 20% and, after stirring, the solution is again filtered and the insoluble matter, if any, discarded. The excess barium in the filtrate is then precipitated by the addition of an equivalent amount of sulfuric acid, being careful to keep the mixture distinctly alkaline by the addition of sodium hydroxide, if necessary. After removal of the barium sulfate by filtration, the solution is diluted to 100$\gamma$/ml. of the active compound and then adjusted to a pH of 7.0. The solution is again filtered and the filtrate is concentrated to a volume such that the active compound is present at a concentration of 200$\gamma$/ml. This solution is extracted with four 10 volume portions of butanol which butanol extracts are discarded. The aqueous phase is then treated with an amount of activated charcoal equivalent to the total weight of the active compound present. The solution is filtered and charcoal discarded. The filtrate is then adjusted to a pH of 3.0 and heated to dissolve the active compound which may precipitate at this acidity. Additional water may be added, if necessary. The saturated solution is then allowed to cool to about 4° C. and the precipitated product is collected. It may be recrystallized by dissolving in hot water adjusted to a pH of 3, if desired.

The purified product occurs in the form of yellow crystals which have an index of refraction parallel to the length of the crystals of 1.559±0.003 and parallel to the width of the crystals 1.744±0.003. The product decomposes when heated without melting.

Example 2

The reaction of the preceding example was also run by dissolving the 2,4,5-triamino-6-hydroxy pyrimidine and para-aminobenzoylglutamic acid in water and adding slowly the alpha, alpha, beta-tribromopropionaldehyde dissolved in alcohol. The pH was maintained at 4 by the occasional addition of sodium hydroxide, when necessary, as determined by a glass electrode pH meter. The crude reaction product was also found to contain a substantial amount of N-[4-{-[(2-amino-4-hydroxy-6-pyrimido [4,5-b] pyrazyl) methyl]-amino}benzoyl]glutamic acid.

I claim:

1. A method of preparing N-[4-{-[(2-amino-4-hydroxy-6-pyrimido [4,5-b]pyrazyl) methyl]-amino-}benzoyl]glutamic acid having the formula

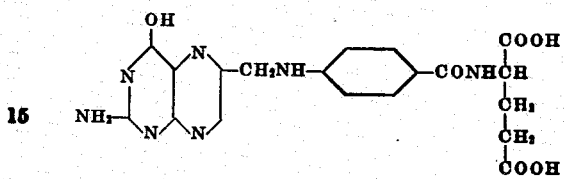

which comprises mixing together and reacting 2,4,5-triamino-6-hydroxy pyrimidine, para-amino-benzoylglutamic acid, and an alpha, alpha, beta-trihalopropionaldehyde and thereafter recovering the said product.

2. A method in accordance with claim 1 in which the alpha, alpha, beta-trihalopropionaldehyde is alpha, alpha, beta-trichloropropionaldehyde.

3. A method in accordance with claim 1 in which the alpha, alpha, beta-trihalopropionaldehyde is alpha, alpha, beta-tribromopropionaldehyde.

4. A method in accordance with claim 1 in which the alpha, alpha, beta-trihalopropionaldehyde is alpha, alpha, beta-triiodopropionaldehyde.

5. A method of preparing compounds having the formula:

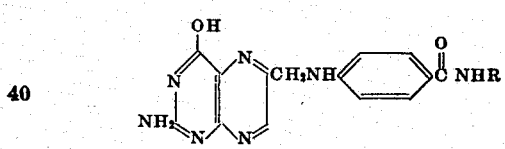

in which the group —NHR represents the radical of an amino acid which comprises mixing together and reacting 2,4,5-triamino-6-hydroxy pyrimidine, an alpha, alpha, beta-trihalopropionaldehyde and an amino acid amide of paraaminobenzoic acid and thereafter recovering the said product.

6. A method in accordance with claim 5 in which the amino acid radical contains at least one molecule of glutamic acid.

7. A method in accordance with claim 5 in which the amino acid amide of p-aminobenzoic acid is p-aminobenzoylglutamylglutamic acid.

8. A method of preparing compounds having the formula

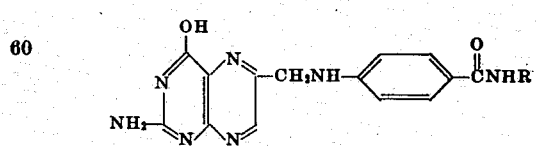

in which the group —NHR represents a radical of an amino acid, which comprises mixing together in a solvent at a pH of from about 3 to 5 2,4,5-triamino-6-hydroxypyrimidine, an alpha,alpha, beta-trihalopropionaldehyde and an amino acid amide of p-aminobenzoic acid, and thereafter recovering the said product.

9. A method in accordance with claim 5 in which the amino acid amide of p-aminobenzoic acid is used in the form of an ester.

JAMES H. BOOTHE.